US011320985B2

(12) United States Patent
Murakami

(10) Patent No.: US 11,320,985 B2
(45) Date of Patent: May 3, 2022

(54) SELECTION DEVICE, SELECTION METHOD, PROGRAM, AND NON-TRANSITORY COMPUTER-READABLE INFORMATION RECORDING MEDIUM

(71) Applicant: Rakuten Group, Inc., Tokyo (JP)

(72) Inventor: Takuya Murakami, Tokyo (JP)

(73) Assignee: Rakuten Groun. Inc., Tokyo (JP)

( * ) Notice: Subject to any disclaimer, the term of this patent is extended or adjusted under 35 U.S.C. 154(b) by 0 days.

(21) Appl. No.: 16/637,790

(22) PCT Filed: Feb. 8, 2018

(86) PCT No.: PCT/JP2018/004300
§ 371 (c)(1),
(2) Date: Feb. 10, 2020

(87) PCT Pub. No.: WO2019/155563
PCT Pub. Date: Aug. 15, 2019

(65) Prior Publication Data
US 2020/0218441 A1    Jul. 9, 2020

(51) Int. Cl.
*G06F 3/0488* (2013.01)
*G06F 3/04883* (2022.01)
(Continued)

(52) U.S. Cl.
CPC ........ *G06F 3/04883* (2013.01); *G06F 3/0482* (2013.01); *G06F 3/04845* (2013.01); *G06F 2203/04803* (2013.01)

(58) Field of Classification Search
CPC ............ G06F 3/04883; G06F 17/2229; G06F 11/3438; G06F 17/245; G06F 3/0482; G06F 3/04845; G06F 2203/04803
(Continued)

(56) References Cited

U.S. PATENT DOCUMENTS 8,335,993 B1 *  12/2012  Tan ..................... G06F 3/04886
                                              715/773
2005/0268247 A1 * 12/2005 Baneth ................ G06F 3/04886
                                              715/781
(Continued)

FOREIGN PATENT DOCUMENTS

JP      8-335140 A      12/1996
JP      2009-101061 A   5/2009
(Continued)

OTHER PUBLICATIONS

International Search Report for PCT/JP2018/004300 dated Mar. 13, 2018 [PCT/ISA/210].

*Primary Examiner* — Sherrod L Keaton
(74) *Attorney, Agent, or Firm* — Sughrue Mion, PLLC

(57) ABSTRACT

A selection device (100) displays objects that are selection subjects on a touch screen, and selects an object according to an operation performed on the touch screen. In this selection device (100), a detector (130) detects a touch operation performed on the touch screen. A divider (150) divides the detection area of the touch screen into a plurality of sections on the basis of the positions of the objects that are currently displayed and the detection position where the detector (130) detected the touch operation. When an operation of selecting one of the sections divided by the divider (150) is detected, a confirmer (160) confirms the selection of the object that corresponds to the selected section.

6 Claims, 13 Drawing Sheets

(51) Int. Cl.
*G06F 3/0482* (2013.01)
*G06F 3/04845* (2022.01)

(58) Field of Classification Search
USPC .......................................................... 715/863
See application file for complete search history.

(56) References Cited

U.S. PATENT DOCUMENTS

| 2010/0295797 | A1* | 11/2010 | Nicholson | G06F 1/169 |
| | | | | 345/173 |
| 2013/0271498 | A1* | 10/2013 | Poalini | G06F 3/0483 |
| | | | | 345/660 |
| 2018/0253212 | A1* | 9/2018 | Oliver | G06F 3/04883 |

FOREIGN PATENT DOCUMENTS

| JP | 2010-067135 A | 3/2010 | | |
| JP | 2013-030050 A | 2/2013 | | |
| JP | 5357811 B2 | 12/2013 | | |
| JP | 2014-085792 A | 5/2014 | | |
| WO | 2010079791 A1 | 7/2010 | | |
| WO | WO-2010079791 A1 * | 7/2010 | ............. | G06F 3/023 |

\* cited by examiner

SELECTION DEVICE, SELECTION METHOD, PROGRAM, AND NON-TRANSITORY COMPUTER-READABLE INFORMATION RECORDING MEDIUM

CROSS REFERENCE TO RELATED APPLICATIONS

This application is a National Stage of International Application No. PCT/JP2018/004300 filed Feb. 8, 2018.

TECHNICAL FIELD

The present disclosure relates generally to a selection device, a selection method, a program, and a non-transitory computer-readable information recording medium.

BACKGROUND ART

Modern electronic devices such as smartphones and tablet terminals include touch screens that enable the performance of intuitive operations by users. For example, when a plurality of objects (selection buttons, icons, or the like) that are selection subjects are displayed on a display section on which a touch screen is overlaid, a user can easily select a desired object by touch operating that object via the touch screen.

In many cases, these types of smartphones and the like are operated with one hand. For example, in some cases, the smartphone is held in the right hand and touch operations are performed using the thumb of the right hand.

Patent Literature 1 discloses an example of an invention of an input device (portable information processing device) suitable for operation with one hand.

CITATION LIST

Patent Literature

Patent Literature 1: Japanese Patent No. 5357811

SUMMARY OF INVENTION

Technical Problem

While a user can operate the input device described in Patent Literature 1 with one hand, such operation is limited to giving responses (Yes or No) to questions. In other words, the invention of Patent Literature 1 is not suited for use in situations such as selecting a desired object from a plurality of objects.

As such, technology has been awaited that enables a user to easily perform operations with one hand when selecting a desired object from a plurality of objects or a similar situation.

The present disclosure is made with the view of the above situation, and an objective of the present disclosure is to provide a selection device that enables a user to easily select an object, a selection method, a program, and a non-transitory computer-readable information recording medium.

Solution to Problem

A selection device according to a first aspect of the present disclosure is a selection device that displays objects that are selection subjects on a touch screen, and selects an object according to an operation performed on the touch screen. The selection device includes a detector that detects a touch operation on the touch screen; a divider that divides a detection area of the touch screen into sections based on positions of the objects that are currently displayed and a detection position where the detector detects the touch operation; and a confirmer that, when an operation of selecting one of the sections divided by the divider is detected, confirms the selection of the object that corresponds to the selected section.

In the selection device according to the aspect described above: the detector may detect a start of a touch operation performed on the touch screen, a continuation of a touch operation performed on the touch screen, and a predetermined operation performed after a start of a touch operation performed on the touch screen, and when a section that is divided by the divider is selected due to the detector detecting the predetermined operation, the confirmer may confirm a selection of the object that corresponds to the selected section.

The selection device according to the aspect described above may further include a display controller that highlights the object associated with a section that includes a latest detection position while the detector is detecting the continuation of the touch operation.

In the selection device according to the aspect described above, the divider may divide, on the basis of positions of the objects that are currently displayed and the detection position where the detector detects the touch operation, the detection area of the touch screen into the sections in which the objects that are currently displayed are partitioned by boundaries that radiate from the detection position.

In the selection device according to the aspect described above, the divider may divide, on the basis of positions of the objects that are currently displayed and the detection position where the detector detects the touch operation, the detection area of the touch screen into the sections in which the objects that are currently displayed are partitioned by curved boundaries that radiate from the detection position.

The selection device according to the aspect described above may further include a selection canceler that does not select any of the objects when the detector detects an end of the touch operation with the sections divided by the divider not being selected.

In the selection device according to the aspect described above, the display controller may also highlight an area indicating the section that includes the latest detection position, as long as the detector detects the continuation of the touch operation.

In the selection device according to the aspect described above, the object that is not displayed on the touch screen may also be possible to be indirectly selected.

A selection method according to a second aspect of the present disclosure is a selection method for a selection device that displays objects that are selection subjects on a touch screen, and selects an object according to an operation performed on the touch screen. The selection method includes detecting a touch operation on the touch screen using the selection device; dividing, using the selection device, a detection area of the touch screen into a plurality of sections on the basis of positions of the objects that are currently displayed and a detection position where the touch operation is detected; and when an operation of selecting one of the sections divided by the divider is detected, confirming, using the selection device, the selection of the object that corresponds to the selected section.

A program according to a third aspect of the present disclosure causes a computer for displaying objects that are selection subjects on a touch screen and for selecting an object according to an operation performed on the touch screen, to function as: a detector that detects a touch operation on the touch screen; a divider that divides a detection area of the touch screen into a plurality of sections on the basis of positions of the objects that are currently displayed and a detection position where the detector detects the touch operation; and a confirmer that, when an operation of selecting one of the sections divided by the divider is detected, confirms the selection of the object that corresponds to the selected section.

This program can be distributed and sold via a computer communication network independent from the computer on which the program is intended to be executed.

A non-transitory computer-readable information recording medium according to a fourth aspect of the present disclosure stores a program causing a computer for displaying objects that are selection subjects on a touch screen and for selecting an object according to an operation performed on the touch screen, to function as: a detector that detects a touch operation on the touch screen; a divider that divides a detection area of the touch screen into a plurality of sections on the basis of positions of the objects that are currently displayed and a detection position where the detector detects the touch operation; and a confirmer that, when an operation of selecting one of the sections divided by the divider is detected, confirms the selection of the object that corresponds to the selected section.

This information recording medium is a non-transitory recording medium and can be distributed and sold independent from computers. Here, the term "non-transitory recording medium" refers to a tangible recording medium. Examples of the non-transitory recording medium include compact disks, flexible disks, hard disks, optical magnetic disks, digital video disks, magnetic tape, and semiconductor memory. The term "transitory recording medium" means the transmission medium (the propagation signal) itself. Examples of transitory recording media include electronic signals, optical signals, and electromagnetic waves. Additionally, the term "temporary storage space" refers to space for temporarily storing data, programs, and the like. Examples of temporary storage space include volatile memory such as random access memory (RAM).

Advantageous Effects of Invention

According to the present disclosure, a user can easily select an object.

DESCRIPTION OF EMBODIMENTS

Hereinafter, embodiments of the present disclosure are described. In the following, to facilitate comprehension, embodiments are described in which the present disclosure is applied to a smartphone. However, the present disclosure can also be similarly applied to information processing devices such as tablet terminals, gaming devices, personal digital assistants (PDA), and the like.

That is, the following embodiments are presented for the purpose of explanation and should not be construed as limiting the scope of the invention of the present disclosure. Therefore, embodiments in which some elements or all elements of these embodiments are replaced with equivalent elements by one skilled in the art can also be employed, and such embodiments are also included within the scope of the present disclosure.

Embodiment 1

Figure 1:
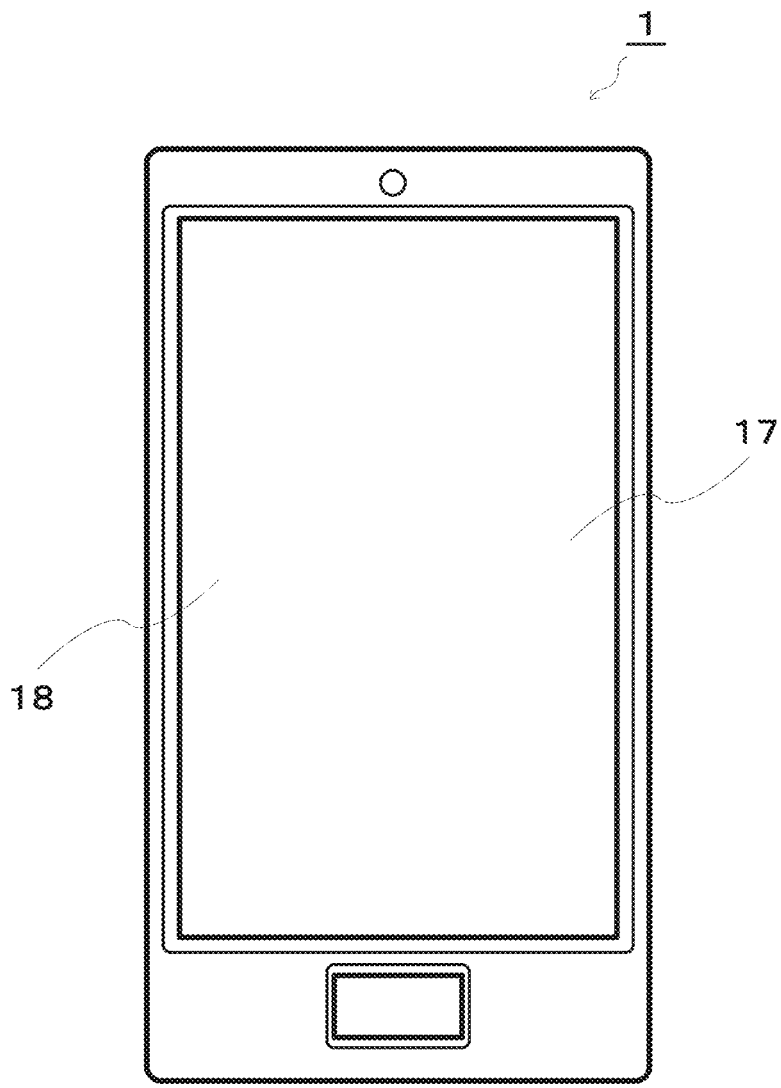
FIG. 1 is a schematic drawing illustrating the appearance of a smartphone.

FIG. 1 is a drawing illustrating the appearance of a typical smartphone in which the selection device according to the present embodiment is to be realized. As illustrated in FIG. 1, this smartphone 1 includes a touch screen 18 on a front surface of a display device 17. The smartphone 1 can be operated by a finger or the like of a user.

Figure 2:
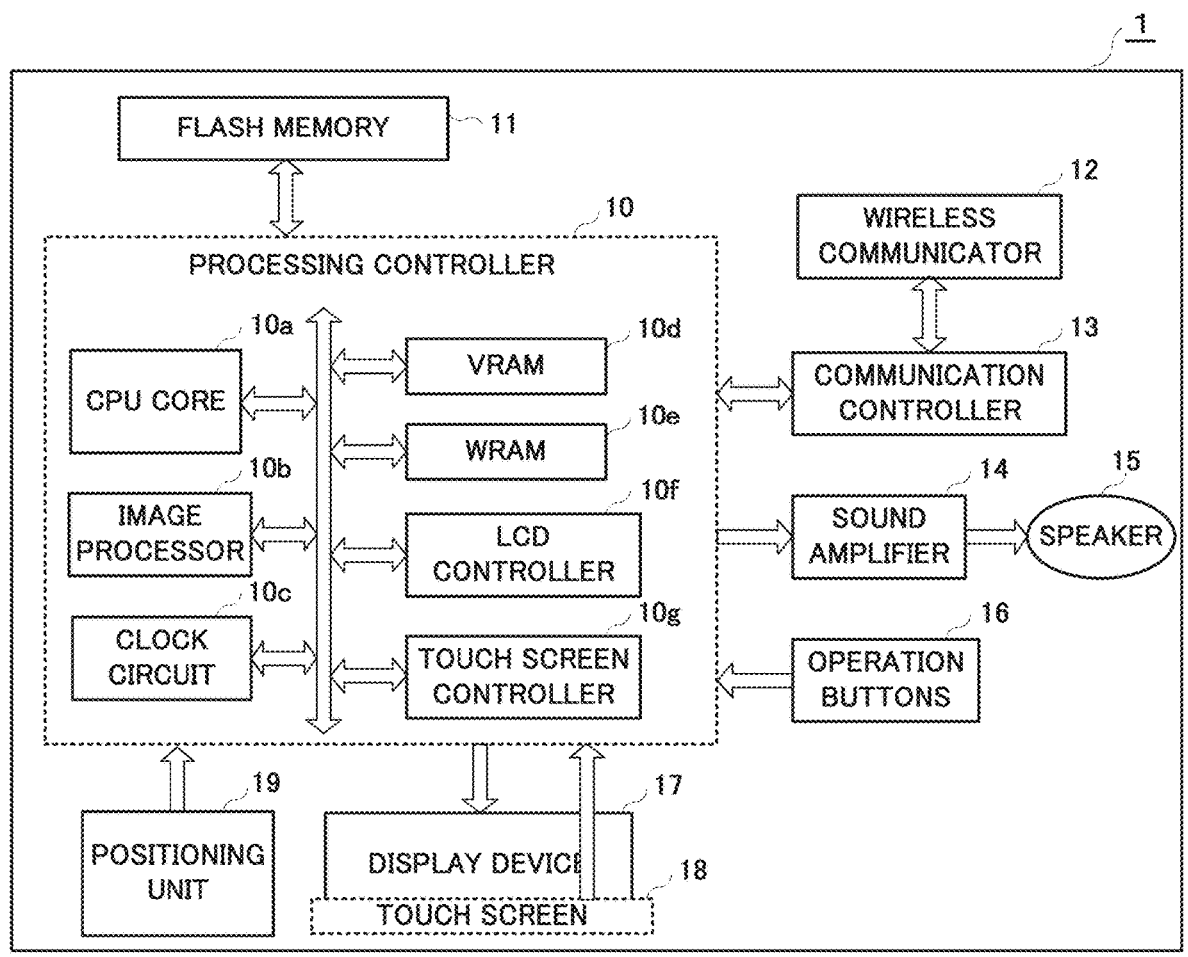
FIG. 2 is a schematic drawing illustrating an overview of the configuration of the smartphone.

FIG. 2 is a schematic drawing illustrating an overview of the configuration of the smartphone 1. Hereinafter, the smartphone 1 is described while referencing FIG. 2.

In one example, the smartphone 1 includes a processing controller 10, flash memory 11, a wireless communicator 12, a communication controller 13, a sound amplifier 14, a speaker 15, operation buttons 16, a display device 17, a touch screen 18, and a positioning unit 19.

The processing controller 10 includes a central processing unit (CPU) core 10*a*, an image processor 10*b*, a clock circuit 10*c*, video random access memory (VRAM) 10*d*, work RAM (WRAM) 10*e*, a liquid crystal display (LCD) controller 10*f*, and a touch screen controller 10*g*.

The CPU core 10*a* controls the operations of the entire smartphone 1, and is connected to and exchanges control signals and data with the various components. Specifically, the CPU core 10a reads application programs and data stored in the flash memory 11 and executes predetermined processes.

The image processor 10b processes the data read from the flash memory 11 and the data processed by the CPU core 10a and, thereafter, stores these data in the VRAM 10d.

The clock circuit 10c is a circuit for measuring various amounts of time (time). The clock circuit 10c measures the current time set in the smartphone 1 and measures the elapsed time and the like needed for the applications and programs.

The VRAM 10d is memory that stores information for displaying. The VRAM 10d stores image information (map images and the like) processed by the image processor 10b or the like.

The WRAM 10e stores work data and the like needed for the CPU core 10a to execute various processes in accordance with the programs.

The LCD controller 10f controls the display device 17 and causes a predetermined display image to be displayed. In one example, the LCD controller 10f converts, at a predetermined synchronization timing, image information (product list screen or the like) stored in the VRAM 10d to a display signal, and outputs this display signal to the display device 17.

When the touch screen 18 is operated by the finger or the like of the user, the touch screen controller 10g acquires the coordinates (detection position) of that operation. For example, in a state in which a product list screen including objects that are selection subjects (selection buttons or the like) is displayed on the display device 17, when the start of a touch operation, the continuation of a touch operation, or a predetermined operation (a force touch, for example) performed after the start of a touch operation is performed on the touch screen 18, the touch screen controller 10g detects that touch operation or the like.

In one example, the flash memory 11 is constituted from a flash solid state drive (SSD), and stores an operation system (OS), various applications and programs and various types of data (product list screens and the like) required to execute those various applications and programs.

The wireless communicator 12 carries out, via a mobile communication network, sending and receiving of voice calls and text messages between the smartphone 1 and another smartphone 1 or the like Additionally, the wireless communicator 12 carries out data communication, via a mobile communication network and/or a wireless access point, with a server on the internet. For example, the wireless communicator 12 may be configured to receive a product list screen or the like from a server of a product selling site, and store the received product list screen or the like in the flash memory 11.

The communication controller 13 controls the wireless communicator 12. The communication controller 13 mediates, in accordance with a predetermined protocol, the wireless communication carried out between the processing controller 10 and another smartphone 1, server, or the like.

The sound amplifier 14 amplifies sound signals generated by the processing controller 10 and feeds these amplified sound signals to the speaker 15.

In one example, the speaker 15 is constituted by stereo speakers or the like. The speaker 15 outputs the speech when calls are placed, music sounds, and the like.

The operation buttons 16 are constituted by a plurality of key switches or the like that are appropriately arranged on the smartphone 1. The operation buttons 16 receive predetermined command inputs that correspond to operations by the user.

The display device 17 is constituted by an LCD or the like. The display device 17 is controlled by the LCD controller 10f and displays a product list screen, for example.

The touch screen 18 is disposed overlaid on the front surface of the display device 17. The touch screen 18 detects various types of operations that are performed by a finger or the like of the user.

In one example, the touch screen 18 is constituted by a capacitive (projected capacitive) touch sensor panel or the like. In such a case, the touch screen 18 detects a touch operation performed by the finger or the like of the user, and outputs information (detection position of the touch operation, or the like) corresponding to the coordinates where that touch operation was performed. In addition, the touch screen 18 includes a sensor that detects capacitance, detects a force touch, which is performed after the start of a touch operation, or the like, and outputs information (detection position of the force touch, or the like) corresponding to the coordinates where that operation was performed.

Note that, instead of the method described above, the touch screen 18 may use the resistive film method to detect, on the basis of changes in resistance values, touch operations and the like performed by the finger or the like of the user.

In one example, the positioning unit 19 receives signals sent from a plurality of global position system (GPS) satellites, and measures the current position of the smartphone at each predetermined timing.

Instead of using GPS satellites, the positioning unit 19 may use the radio wave strengths (reception strength, or the like) from a plurality of base stations to measure the current position of the smartphone 1.

Overview of Configuration of Selection Device

Figure 3:
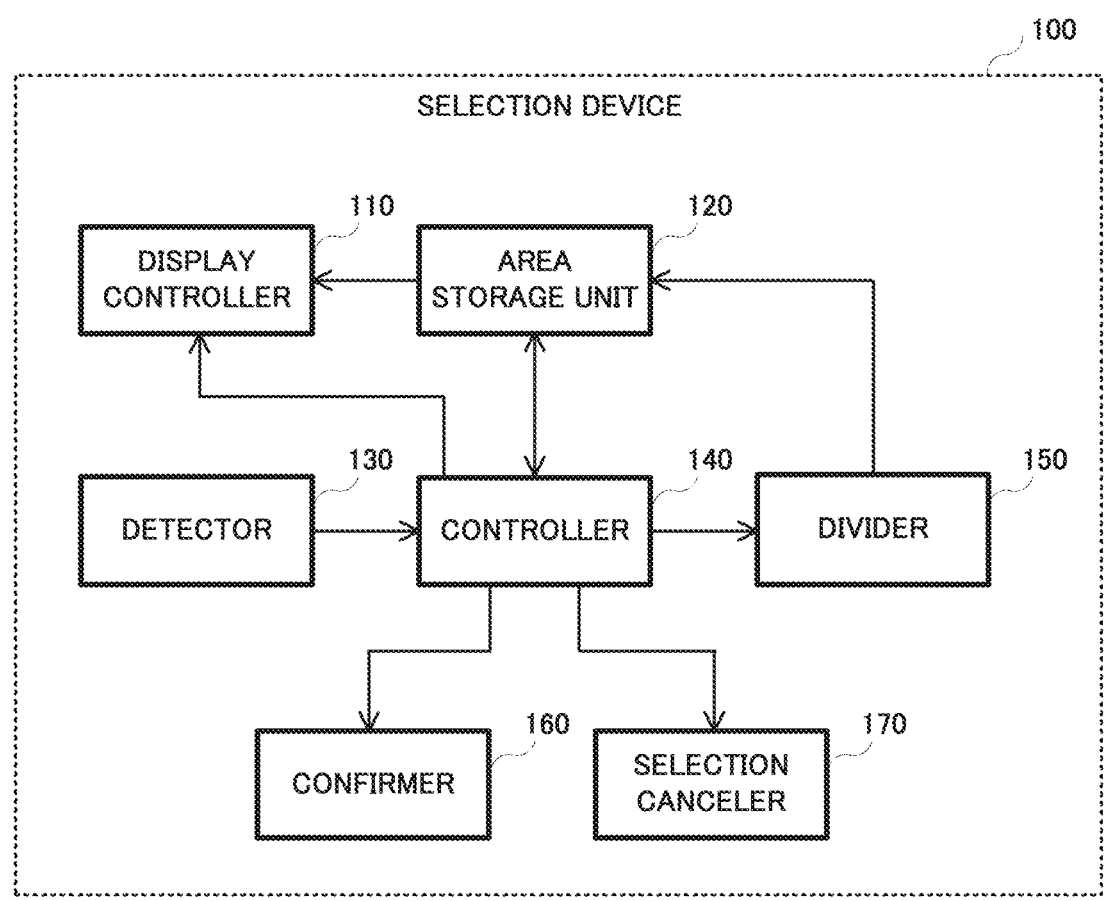
FIG. 3 is a block diagram illustrating an overview of the configuration of a selection device according to an embodiment.

FIG. 3 is a schematic drawing illustrating an overview of the configuration of a selection device 100 according to the present embodiment. Hereinafter, the selection device 100 is described while referencing FIG. 3.

The selection device 100 includes a display controller 110, an area storage unit 120, a detector 130, a controller 140, a divider 150, a confirmer 160, and a selection canceler 170.

Figure 4:
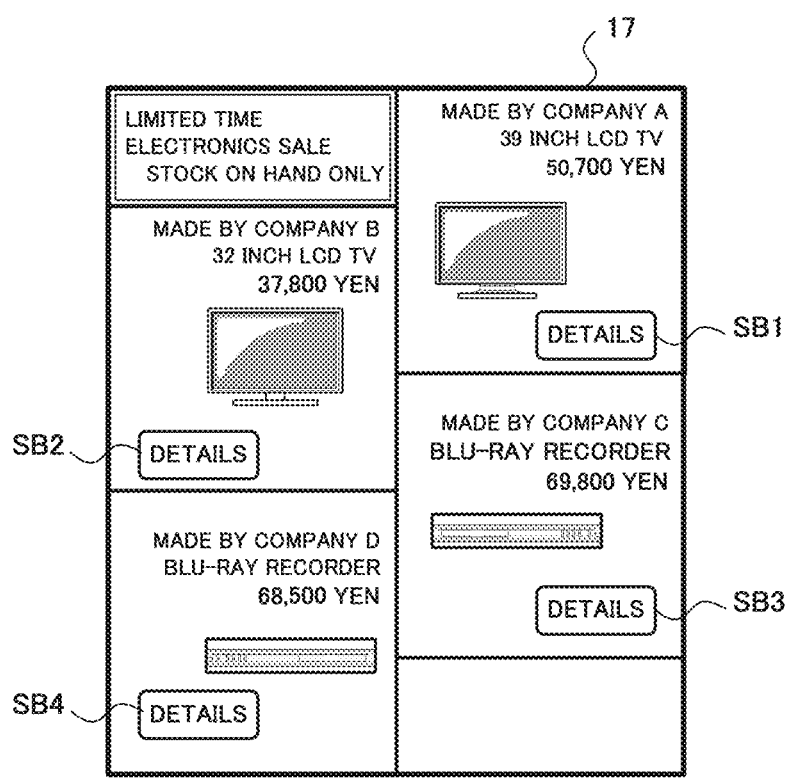
FIG. 4 is a schematic drawing illustrating an example of a product list screen.

The display controller 110 displays various images in the display section. For example, the display controller 110 displays a plurality of objects that are selection subjects on the display device 17, on which the touch screen 18 is overlaid. Specifically, a product list screen including selection buttons SB (SB1 to SB4) such as that illustrated in FIG. 4 is displayed on the display device 17.

Note that the image processor 10b or the like can function as this display controller 110.

Returning to FIG. 3, the area storage unit 120 stores the active areas (range information) of the detection area of the touch screen 18. In one example, these active areas are areas for determining whether touch operations on the plurality of objects displayed on the display device 17 are valid.

Figure 5:
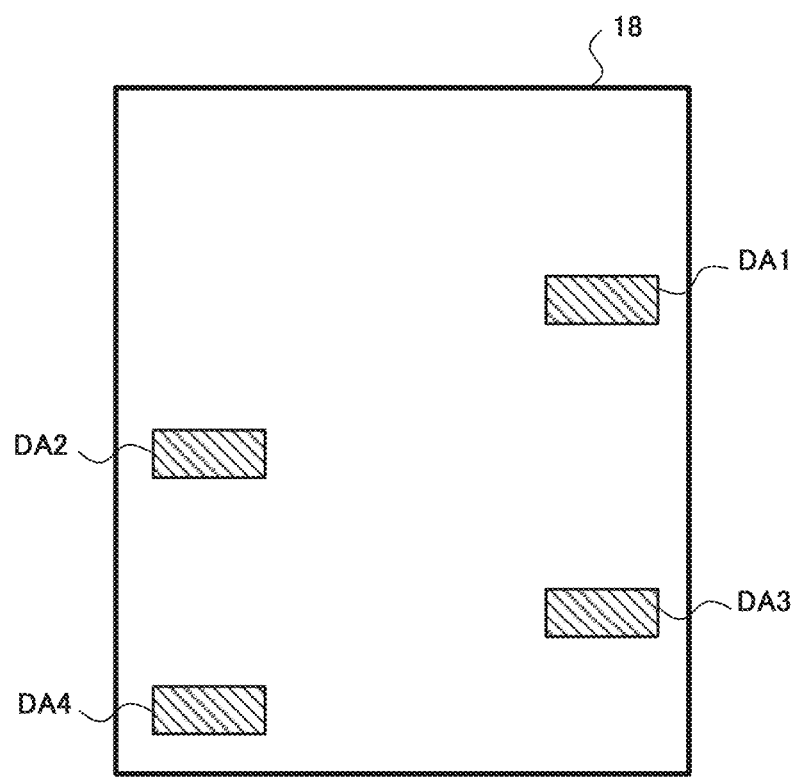
FIG. 5 is a schematic drawing illustrating an example of detection areas that are stored in an area storage unit.

Specifically, as illustrated in FIG. 5, the area storage unit 120 stores range information that indicates the active areas DA (DA1 to DA4) of the detection areas of the touch screen 18. These active areas DA correspond to the selection buttons SB of FIG. 4. That is, when a user touch operates one of the selection buttons SB via the touch screen 18, the detection position of that touch operation is determined to be in an active area DA (corresponding active area DA), and that selection button SB is selected. As discussed later, the active areas DA can be modified as appropriate.

Note that the flash memory 11 or the like can function as the area storage unit 120.

Returning to FIG. 3, the detector 130 detects touch operations on the touch screen 18. That is, the detector 130 detects the start of touch operations, the continuation of touch operations, and predetermined operations (a force touch, for example) performed after the start of touch operations on the touch screen 18.

Figure 6:
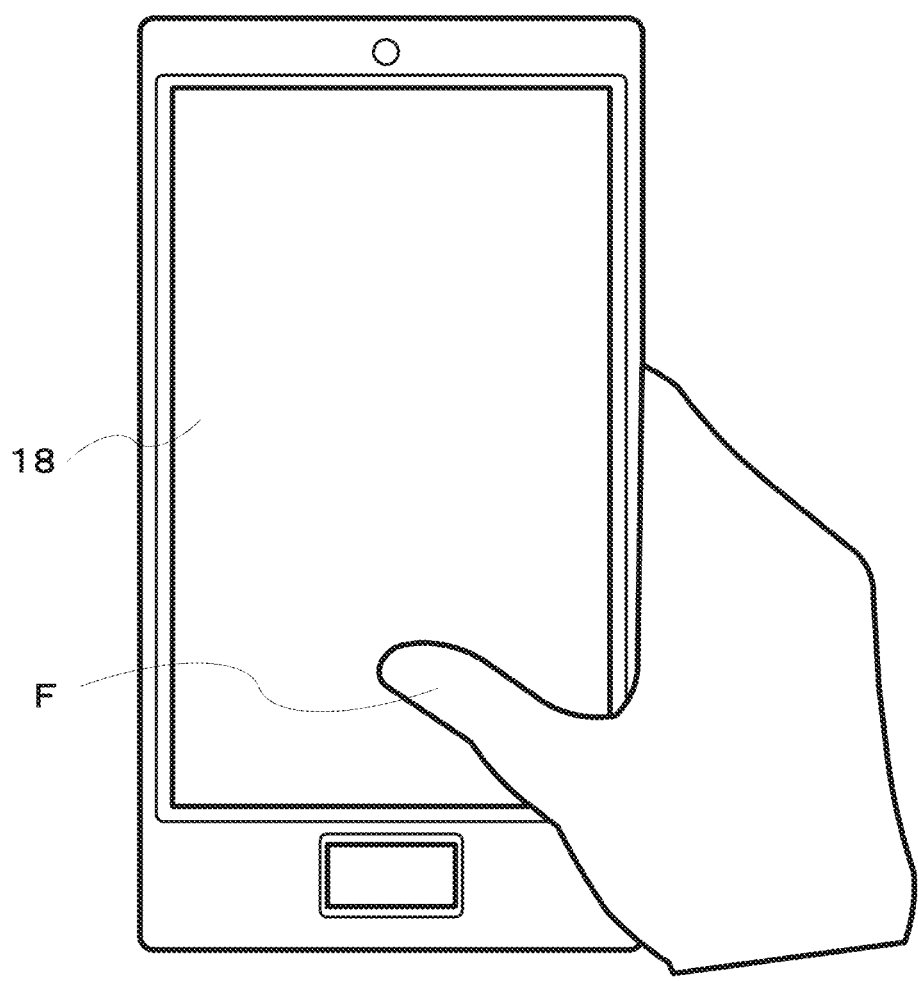
FIG. 6 is a schematic drawing for explaining a touch operation performed on a touch screen.

In one example, as illustrated in FIG. 6, the detector 130 detects a touch operation performed on the touch screen 18 by a finger F or the like of the user, and acquires the detection position of that touch operation. Moreover, the detector 130 detects a force touch performed after the start of the touch operation, and acquires the detection position of that force touch.

Note that the touch screen controller 10g or the like can function as the detector 130.

Returning to FIG. 3, the controller 140 controls the entire selection device 100.

For example, the controller 140 controls the display controller 110 to generate a product list screen such as that illustrated in FIG. 4.

Moreover, the controller 140 appropriately compares the detection position of the touch operation detected by the detector 130 with the active areas (range information) stored in the area storage unit 120, and determines the validity of the touch operation or the like.

Note that the CPU core 10a or the like can function as the controller 140.

The divider 150 appropriately divides the detection area of the touch screen 18. That is, the divider 150 divides the detection area of the entire touch screen 18 into a plurality of sections on the basis of the positions of the objects that are currently displayed and the detection position where the detector 130 detected the touch operation.

For example, when the detector 130 detects a touch operation at a position where the selection buttons SB (SB1 to SB4) are not displayed while a product list screen such as that illustrated in FIG. 4 is displayed on the display device 17, the divider 150 divides, on the basis of the detection position, the detection area of the entire touch screen 18 into a plurality of sections equal to the number of the plurality of selection buttons SB, and uniquely associates each of the plurality of selection buttons SB with each of the plurality of sections.

Figure 7:
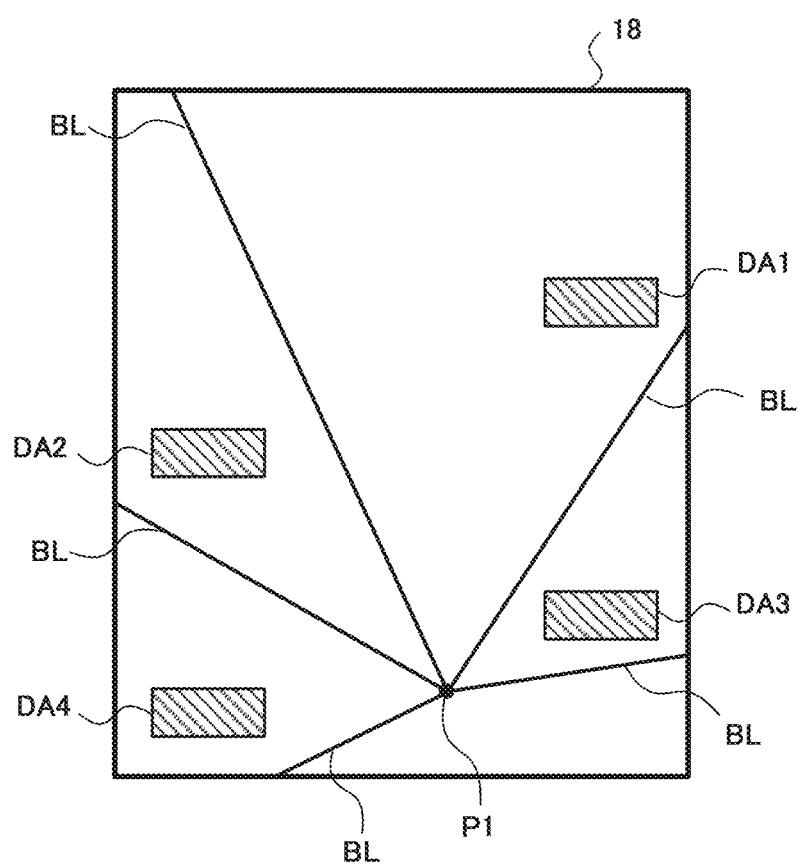
FIG. 7 is a schematic drawing for explaining a situation in which the detection area is divided into sections by boundaries radiating from a detection position of the touch operation.

That is, as illustrated in FIG. 7, when a position P1, which is outside the range of the active areas DA (DA1 to DA4) that correspond to the selection buttons SB, is touch operated, the divider 150 divides the detection area of the touch screen 18 into four sections partitioned by boundaries BL that radiate from the position P1. At this time, the divider 150 divides the detection area such that each section includes one of the active areas DA.

Figure 8:
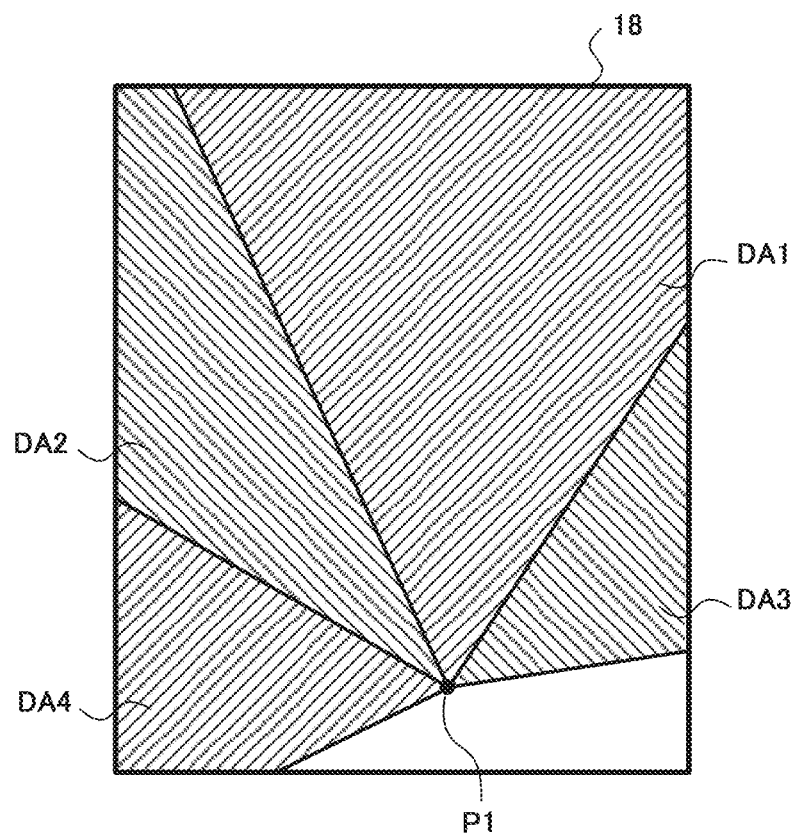
FIG. 8 is a schematic drawing illustrating an example of the divided detection area that is stored in the area storage unit.

Then, as illustrated in FIG. 8, the divider 150 updates the area storage unit 120 so that each of the divided sections is one of the active areas DA (DA1 to DA4).

Note that the CPU core 10a or the like can function as the divider 150.

Thus, when the detection area of the touch screen 18 is divided, the display controller 110 highlights the selection button SB associated with the section that includes the latest detection position for as long as the detector 130 detects the continuation of the touch operation.

Figure 9:
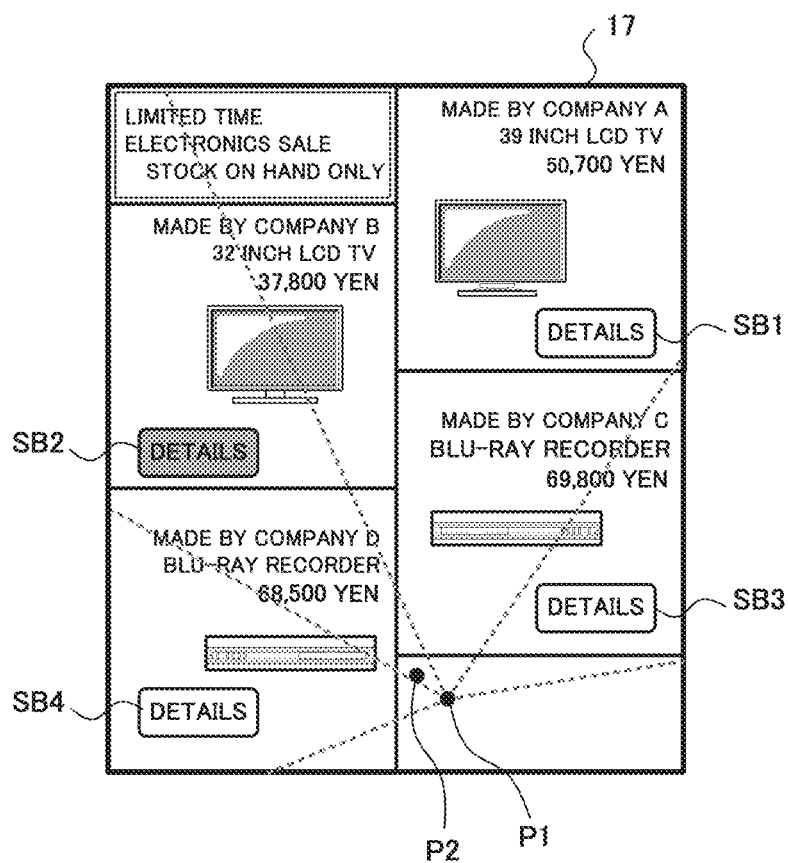
FIG. 9 is a schematic drawing for explaining a situation in which a selection button is highlighted during a continuing touch operation.

For example, if the latest detection position is at a position P2 as illustrated in FIG. 9, the display controller 110 highlights the selection button SB2.

Returning to FIG. 3, when an operation of selecting one of the sections divided by the divider 150 is detected, the confirmer 160 confirms the selection of the object that corresponds to the selected section. In one example, when the detector 130 detects a force touch, the confirmer 160 confirms the selection of the selection button SB that is associated with the section that includes the detection position of that force touch.

For example, when a force touch is detected at the position P2 as illustrated in FIG. 9, the confirmer 160 confirms the selection of the selection button SB2.

Note that the CPU core 10a or the like can function as the confirmer 160.

When the detector 130 detects the end of the touch operation with the sections divided by the divider 150 not being selected, the selection canceler 170 cancels selecting of the objects and does not select any of the objects. For example, the selection canceler 170 does not select any of the selection buttons SB when the detector 130 detects the end of the touch operation without detecting a force touch.

In this case, the display controller 110 stops highlighting the selection button SB2 illustrated in FIG. 9, and returns to displaying the product list screen illustrated in FIG. 4.

Additionally, the controller 140 stops dividing the detection area of the touch screen 18 illustrated in FIG. 8, and refreshes the area storage unit 120 so as to restore the active areas DA illustrated in FIG. 5.

Note that the CPU core 10a or the like can function as the selection canceler 170.

Overview of Operations of Selection Device

Hereinafter the operations of the selection device 100, configured as described above, are described while referencing the drawings. As an example, the operations of the selection device 100 while the product list screen illustrated in FIG. 4 is displayed on the display device 17 are described while referencing FIG. 10.

Figure 10:
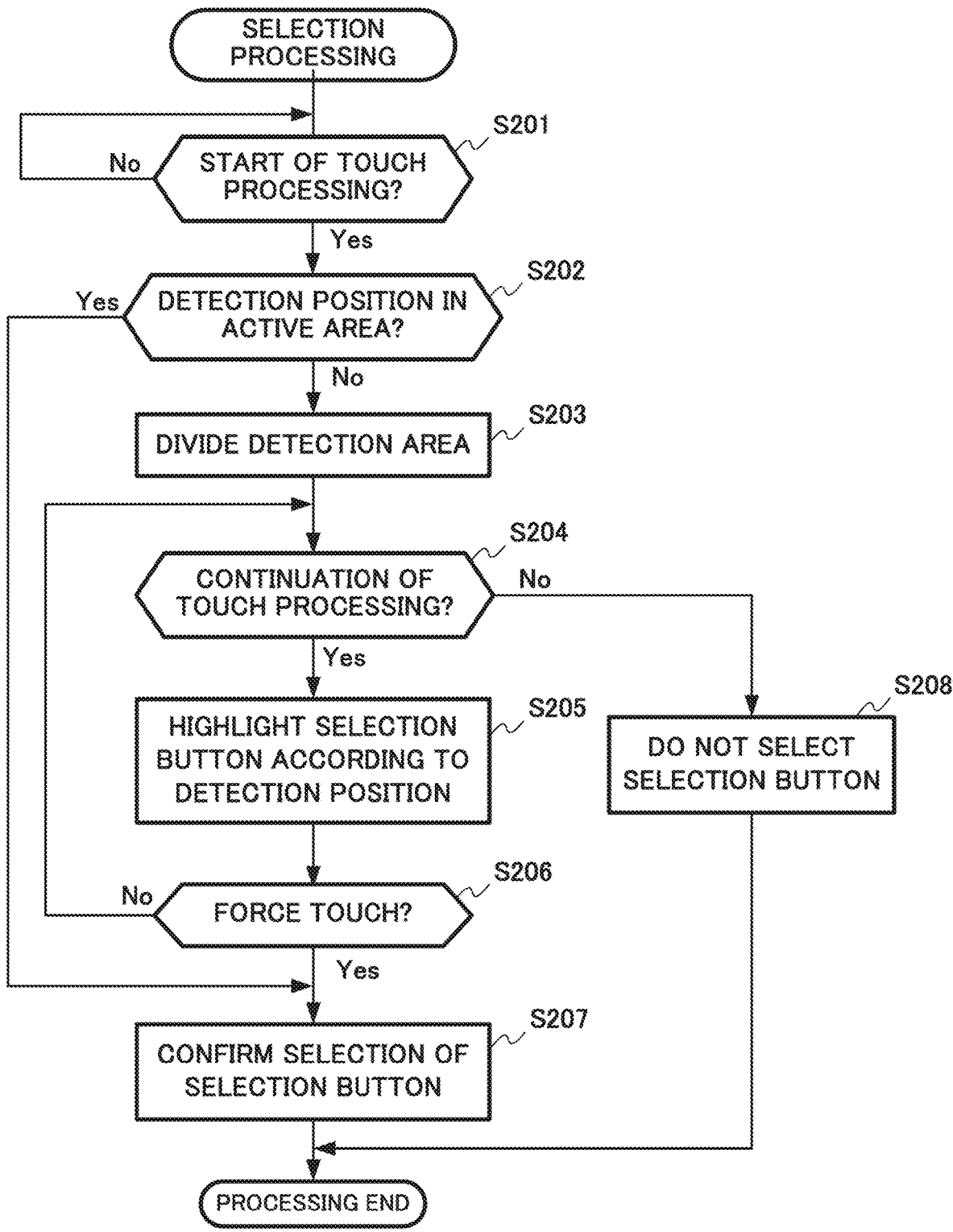
FIG. 10 is a flowchart for explaining selection processing according to an embodiment.

FIG. 10 is a flowchart illustrating the flow of selection processing executed by the selection device 100.

First, the selection device 100 determines whether a touch operation on the touch screen 18 has started (step S201).

Specifically, the controller 140 determines, using the detector 130, whether the start of a touch operation on the touch screen 18 is detected.

When it is determined that a touch operation on the touch screen 18 has not started (step S201; No), the selection device 100 waits as-is for the start of a touch operation.

When it is determined that a touch operation on the touch screen 18 has started (step S201; Yes), the selection device 100 determines whether the detection position is in an active area (step S202).

Specifically, the controller 140 determines whether the detection position detected by the detector 130 is in the range of the active areas DA (DA1 to DA4) of FIG. 5.

When the selection device 100 determines that the detection position is in an active area (step S202; Yes), the processing proceeds to the processing of step S207 (described later).

That is, as described later, the selection of the selection button SB that corresponds to the active area DA determined to be in the range is confirmed.

When it is determined that the detection position is not in an active range (is outside the active ranges) (step S202; No), the selection device 100 divides the detection area (step S203).

Specifically, the divider 150 divides the detection area of the touch screen 18 into a plurality of sections on the basis of the positions of the objects that are currently displayed and the detection position. In one example, the divider 150 divides, on the basis of the detection position, the detection area of the touch screen 18 into a plurality of sections equal to the number of the plurality of selection buttons SB, and uniquely associates each of the plurality of selection buttons SB with each of the plurality of sections.

For example, as illustrated in FIG. 7, when a position P1, which is outside the range of the active areas DA (DA1 to DA4) that correspond to the selection buttons SB, is touch operated, the divider 150 divides the detection area of the touch screen 18 into four sections partitioned by boundaries BL that radiate from the position P1. At this time, the divider 150 divides the detection area such that each section includes one of the active areas DA.

Then, as illustrated in FIG. 8, the divider 150 updates the area storage unit 120 so that each of the divided sections is one of the active areas DA (DA1 to DA4).

The selection device 100 determines whether the touch operation is continuing (step S204).

Specifically, the controller 140 determines, using the detector 130, whether a continuation of the touch operation is detected.

When the selection device 100 determines that the touch operation is continuing (step S204; Yes), the selection device 100 highlights the selection button according to the detection position (step S205).

Specifically, the display controller 110 highlights the selection button SB associated with the section that includes the latest detection position, as long as the detector 130 detects the continuation of the touch operation.

For example, if the latest detection position is at a position P2 as illustrated in FIG. 9, the display controller 110 highlights the selection button SB2.

The selection device 100 determines whether a force touch is performed (step S206).

Specifically, the controller 140 determines, using the detector 130, whether a force touch is detected.

When the selection device 100 determines that a force touch is not performed (step S206; No), the processing returns to the processing of step S204.

When it is determined that a force touch is performed (step S206; Yes), the selection device 100 confirms the selection of the selection button SB that is associated with the section that includes the detection position of that force touch (S207).

For example, when a force touch is detected at the position P2 as illustrated in FIG. 9, the confirmer 160 confirms the selection of the selection button SB2.

Note that, in step S202, when it is determined that the detection position is in an active area (step S202; Yes), the selection device 100 confirms the selection of the selection button SB that corresponds to that active area DA.

In step S204, when it is determined that a touch operation is not continuing (step S204; No), the selection device 100 does not select a selection button (step S208).

Specifically, the selection canceler 170 does not select any of the selection buttons SB when the detector 130 detects the end of a touch operation without detecting a force touch.

Note that, in the selection processing of FIG. 10, a case is illustrated in which the selection processing ends after step S208. However, it is possible to return to the processing of step S201 and wait for a touch operation to start.

In this case, before returning to the processing of step S201, the display controller 110 stops highlighting the selection button SB2 illustrated in FIG. 9 and returns to the product list screen illustrated in FIG. 4, and the controller 140 stops dividing the detection area of the touch screen 18 illustrated in FIG. 8 and refreshes the area storage unit 120 so as to restore the active areas DA illustrated in FIG. 5.

As a result of the selection processing described above, the user can easily perform operations with one hand, even in situations in which the plurality of selection buttons SB (SB1 to SB4) is displayed on the product list screen illustrated in FIG. 4, and the user selects a desired selection button SB object from that product list screen.

For example, when the user is holding the smartphone in the right hand and touch operating the smartphone using the thumb of the right hand, in a case in which the user desires to select a selection button SB that is out of reach of the thumb of the right hand, the user performs a touch operation at a position where none of the selection buttons SB are displayed.

When the position where none of the selection buttons SB are display is touch operated, the detection area is divided into four sections partitioned by the boundaries BL that radiate from the position P1 (the position where the touch operation is performed) as illustrated in FIG. 7. That is, the detection area is divided such that each section includes one of the active areas DA.

Additionally, as illustrated in FIG. 8, the selection device 100 updates the area storage unit 120 such that each of the divided sections is one of the active areas DA (DA1 to DA4).

When the user moves the touch position to one of the plurality of divided sections, the selection device 100 highlights the selection button SB2 associated with the section that includes the position P2 (in a case in which the latest detection position is the position P2), as illustrated in FIG. 9. Since the sections are radially divided based on the position P1, it is possible to enter another section by moving the touch position only a small amount. As such, any of the selection buttons SB can be easily highlighted.

Moreover, when the user performs a force touch on the touch screen 18 while a selection button SB is highlighted, the selection of that selection button SB is confirmed.

As a result, the user can easily perform operations with one hand, even in situations in which a plurality of selection buttons SB is displayed on the product list screen, and the user selects a desired selection button SB object from those selection buttons SB.

Therefore, the user can easily select an object.

Other Embodiments

In the embodiment described above, an example is described in which the detection area of the touch screen 18 is divided and, in this state, as illustrated in FIG. 9, the display controller 110 highlights the selection button SB associated with the section that includes the latest detection position. However, a configuration is possible in which not only the selection button SB, but the section that includes the latest detection position is also highlighted.

Figure 11:
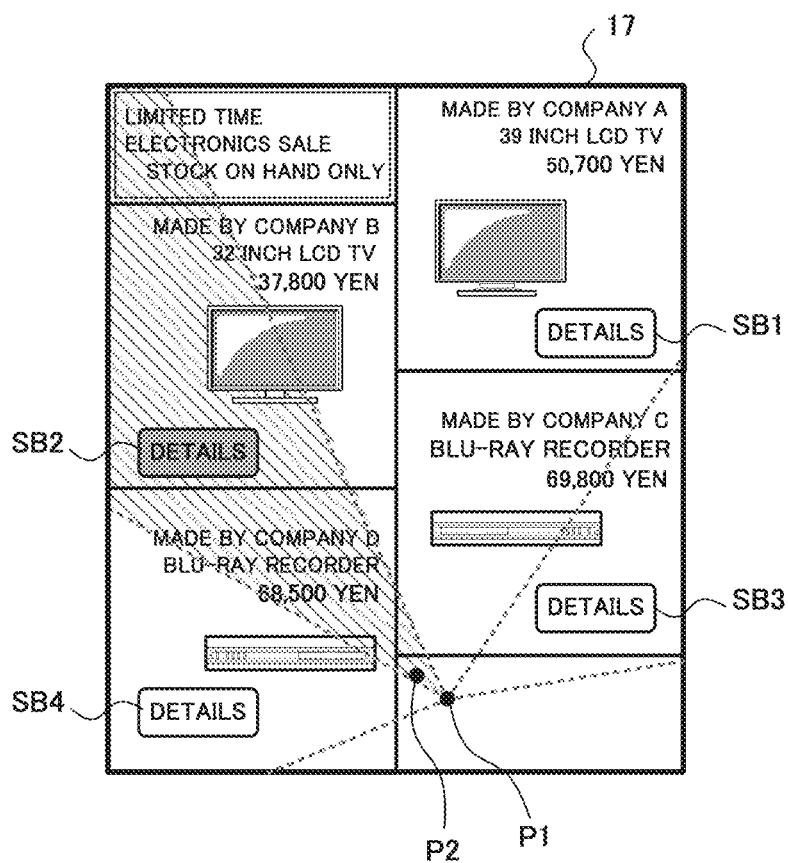
FIG. 11 is a schematic drawing for explaining a situation in which a section is highlighted in addition to the selection button being highlighted during a continuing touch operation.

For example, as illustrated in FIG. 11, in a case in which the latest detection position is the position P2, the display controller 110 may highlight not only the selection button SB2, but also the section that includes the position P2.

In this case, due to the fact that the section is also selected, it is easier to ascertain the amount to move the finger, while performing the touch operation, in order to select a different selection button SB.

In the embodiment described above, an example is described in which the divider 150 divides the detection area of the touch screen 18 into a plurality of sections partitioned by boundaries BL that radiate from the position P1. However, this is merely an example and other techniques may be used to divide the detection area of the touch screen 18.

Figure 12:
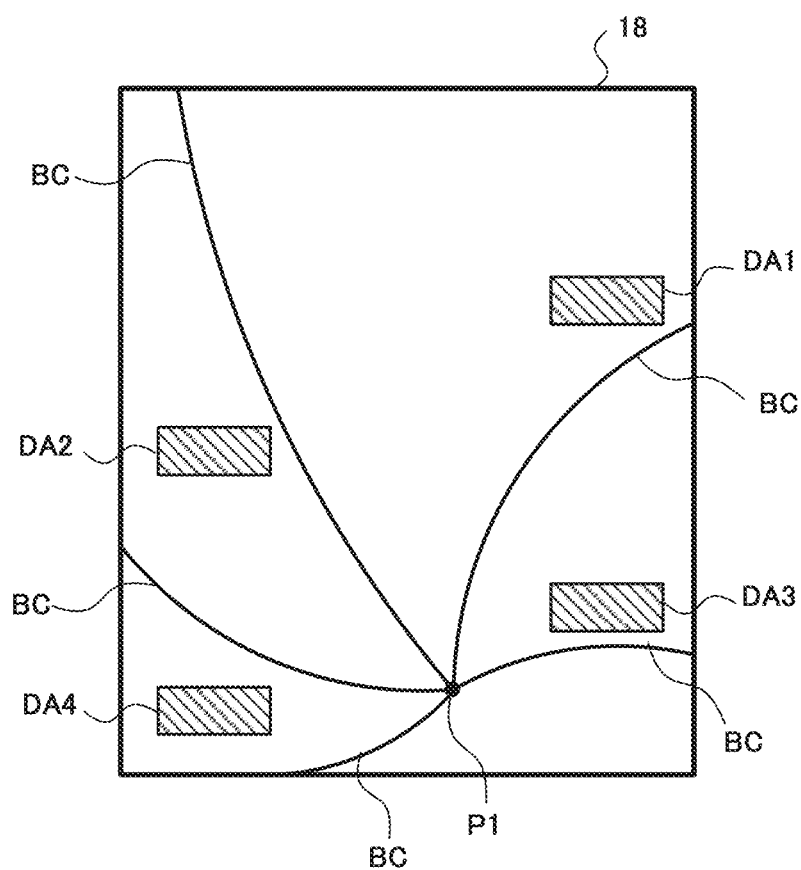
FIG. 12 is a schematic drawing for explaining a situation in which the detection area is divided into sections by curves radiating from the detection position of the touch operation.

For example, as illustrated in FIG. 12, the detection area of the touch screen 18 may be divided into a plurality of sections partitioned by curved boundaries BC that radiate from the position P1 (the touch position).

In this case, the divider 150 divides the detection area into a plurality of sections by the radiating curved boundaries BC, and the widths of the sections are roughly equivalent at a predetermined distance from the position P1. That is, when it is not possible to make the width of each section at a predetermined distance from the position P1 equivalent by dividing with straight lines, dividing with radiating curved lines makes it possible to obtain equivalent widths at a predetermined distance from the position P1.

In the embodiment described above, as illustrated in FIG. 4, a case is described in which, in the product list screen, all of the selection buttons SB (SB1 to SB4) are displayed. However, when scrolling of the screen is enabled, there may be situations in which a portion of the selection buttons SB is not displayed on the current screen. In such a case, a configuration is possible in which it is possible to select even the selection buttons SB that are not displayed (that is, the objects that are not displayed).

Figure 13:
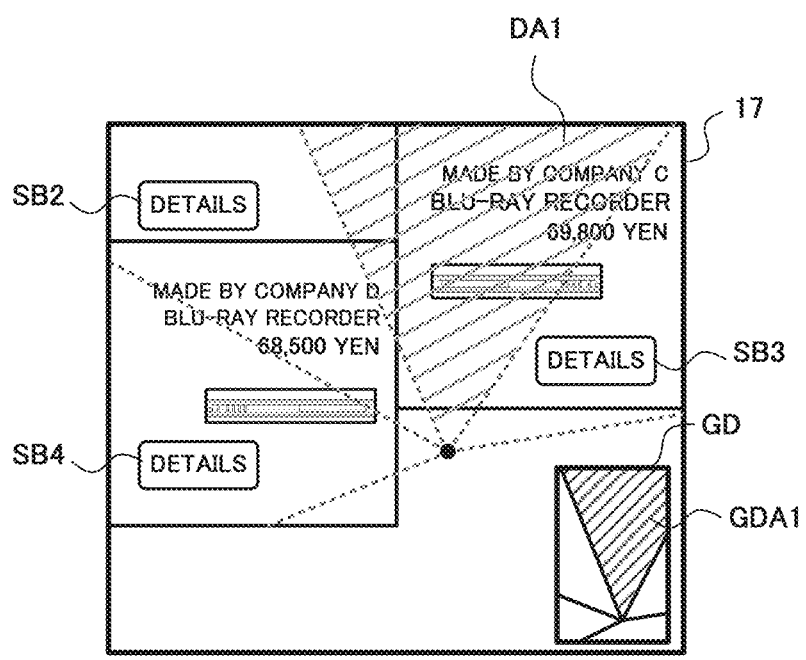
FIG. 13 is a schematic drawing for explaining a situation in which a selection button that is not displayed is selected.

For example, as illustrated in FIG. 13, when only a portion of the product list screen is displayed, a guide screen GD that guides the entire display is displayed. Here, a configuration is possible in which, when a section GDA1, for example, of the guide screen GD is selected, the selection button SB (selection button SB1 that is not displayed) associated with a corresponding section DA1 is selected.

This configuration makes it possible to indirectly select a selection button SB1 (object) that is not displayed.

In this case as well, the user can easily select an object.

INDUSTRIAL APPLICABILITY

As described above, according to the present disclosure, a selection device that enables a user to easily select an object, a selection method, a program, and a non-transitory computer-readable information recording medium can be provided.

REFERENCE SIGNS LIST

1 Smartphone
10 Processing controller
11 Flash memory
12 Wireless communicator
13 Communication controller
14 Sound amplifier
15 Speaker
16 Operation button
17 Display device
18 Touch screen
19 Positioning unit
100 Selection device
110 Display controller
120 Area storage unit
130 Detector
140 Controller
150 Divider
160 Confirmer
170 Selection canceler

The invention claimed is:

1. A selection device of displaying objects that are selection subjects on a touch screen and selecting a selectable object according to an operation performed on the touch screen, the selection device comprising:
at least one memory configured to store computer program code;
at least one processor configured to operate according to the computer program code, the computer program code including:
detector code configured to cause at least one of the at least one processor to detect a touch operation on the touch screen;
divider code configured to cause at least one of the at least one processor to radially divide a detection area of the touch screen into sections based on positions of the selectable objects that are currently displayed and a detection position where the touch operation is detected, wherein each of the divided sections is uniquely associated with one of the selectable objects on the screen, and the divided sections are divided differently from each other;
confirmer code configured to cause at least one of the at least one processor to confirm that, when an operation of selecting one of the sections divided is detected, confirms the selection of the selectable object that corresponds to the selected section,
selection canceler code configured to cause at least one of the at least one processor to not select any of the objects when an end of the touch operation is detected with the sections divided not being selected in the plurality of sections; and
display controller code, wherein
the detector code is further configured to cause at least one of the at least one processor to detect a start of a touch operation performed on the touch screen, a continuation of a touch operation performed on the touch screen, and a predetermined operation performed after the start of the touch operation performed on the touch screen,
the display controller code is configured to cause at least one of the at least one processor to highlight the selectable object associated with a section that includes a latest detection position while the detector code causes at least one of the at least one processor to detect the continuation of the touch operation,
the confirmer code is further configured to cause at least one of the at least one processor to confirm when a section that is divided is selected due to the detection of the predetermined operation, a selection of the object that corresponds to the selected section,
the display controller code is further configured to cause at least one of the at least one processor to highlight an area indicating the section that includes the latest detection position while the detector code causes at least one of the at least one processor to detect the continuation of the touch operation, and
wherein the highlighting of the area and the highlighting of the selectable object that corresponds to the area are presented on the touch screen simultaneously and the highlighting of the area is different from the highlighting of the selectable object that corresponds to the area.

2. The selection device according to claim 1, wherein the divider code is further configured to cause at least one of the at least one processor to divide on the basis of positions of the selectable objects that are currently displayed and the detection position where the detector code causes at least one of the at least one processor to detect the touch operation, the detection area of an entirety of the touch screen into the sections in which the selectable objects that are currently displayed are partitioned by boundaries that radiate from the detection position.

3. The selection device according to claim 1, wherein the divider code is further configured to cause at least one of the at least one processor to divide based on positions of the selectable objects that are currently displayed and the detection position where the detector code causes at least one of the at least one processor to detect the touch operation, the detection area of an entirety of the touch screen into the sections in which the selectable objects that are currently displayed are partitioned by curved boundaries that radiate from the detection position.

4. The selection device according to claim 1, wherein selectable object that is not displayed on the touch screen is also possible to be indirectly selected.

5. A selection method for a selection device of displaying objects that are selection subjects on a touch screen and selecting a selectable object according to an operation performed on the touch screen, the selection method comprising:
   detecting a touch operation on the touch screen using the selection device;
   radially dividing, using the selection device, a detection area of the touch screen into a plurality of sections on the basis of positions of the selectable objects that are currently displayed and a detection position where the touch operation is detected,
   wherein each of the divided sections is uniquely associated with one of the selectable objects on the screen, and the divided sections are divided differently from each other;
   detecting, using the selection device, a start of a touch operation performed on the touch screen, a continuation of a touch operation performed on the touch screen, and a predetermined operation performed after the start of the touch operation performed on the touch screen;
   highlighting, using the selection device, the selectable object associated with a section that includes a latest detection position and an area indicating the section that includes the latest detection position at the same time and distinguishably, while the continuation of the touch operation is detected,
   wherein the highlighting of the area and the highlighting of the selectable object that corresponds to the area are presented on the touch screen simultaneously and the highlighting of the area is different from the highlighting of the selectable object that corresponds to the area;
   when an operation of selecting one of the sections that is divided is detected due to the detection of the predetermined operation, confirming, using the selection device, the selection of the selectable object that corresponds to the selected section, and
   when an end of the touch operation with the sections divided not being selected is detected, not selecting any of the objects in the plurality of sections.

6. A non-transitory computer-readable recording medium storing a program causing a computer for displaying objects that are selection subjects on a touch screen and for selecting a selectable object according to an operation performed on the touch screen, to:
   detect a touch operation on the touch screen;
   radially divide a detection area of the touch screen into a plurality of sections on the basis of positions of the selectable objects that are currently displayed and a detection position where the touch operation is detected, wherein each of the divided sections is uniquely associated with one of the selectable objects on the screen, and the divided sections are divided differently from each other;
   detect a start of a touch operation performed on the touch screen, a continuation of a touch operation performed on the touch screen, and a predetermined operation performed after the start of the touch operation performed on the touch screen;
   highlight the selectable object associated with a section that includes a latest detection position and an area indicating a section that includes the latest detection position while the continuation of the touch operation is detected,
   wherein the highlighting of the area and the highlighting of the selectable object that corresponds to the area are presented on the touch screen simultaneously and the highlighting of the area is different from the highlighting of the selectable object that corresponds to the area;
   when an operation of selecting one of the sections divided is detected due to the detection of the predetermined operation, confirm the selection of the selectable object that corresponds to the selected section, and
   when an end of the touch operation with the sections divided not being selected is detected, not selecting any of the selectable objects in the plurality of sections.

* * * * *